(12) United States Patent
Xu et al.

(10) Patent No.: US 12,058,143 B2
(45) Date of Patent: Aug. 6, 2024

(54) DYNAMIC PATH VERIFICATION METHOD BASED ON REORGANIZATION OF AUTHENTICATION FRAGMENTS

(71) Applicant: Tsinghua University, Beijing (CN)

(72) Inventors: Ke Xu, Beijing (CN); Fan Yang, Beijing (CN); Bo Wu, Beijing (CN); Qi Li, Beijing (CN); Jianping Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 256 days.

(21) Appl. No.: 17/665,735

(22) Filed: Feb. 7, 2022

(65) Prior Publication Data
US 2022/0159012 A1    May 19, 2022

Related U.S. Application Data

(63) Continuation of application No. PCT/CN2021/088810, filed on Apr. 21, 2021.

(30) Foreign Application Priority Data

Apr. 24, 2020    (CN) .......................... 202010332303.9

(51) Int. Cl.
*H04L 9/40*    (2022.01)
*H04L 9/08*    (2006.01)
*H04L 9/32*    (2006.01)

(52) U.S. Cl.
CPC .......... *H04L 63/12* (2013.01); *H04L 63/0435* (2013.01); *H04L 63/08* (2013.01); *H04L 63/166* (2013.01); *H04L 63/20* (2013.01); *H04L 9/0869* (2013.01); *H04L 9/3239* (2013.01); *H04L 9/3271* (2013.01); *H04L 63/0442* (2013.01)

(58) Field of Classification Search
CPC . G06F 40/143; H04L 63/0442; H04L 9/3271; H04L 9/0869; H04L 9/3239; G05B 23/0264
See application file for complete search history.

(56) References Cited

U.S. PATENT DOCUMENTS

2008/0095368 A1*  4/2008  Iida ..................... H04L 63/0442
                                                              380/259
2008/0235251 A1*  9/2008  Shmueli ................ G06F 40/143
(Continued)

OTHER PUBLICATIONS

WIPO, International Search Report for International Application No. PCT/CN2021/088810, Jun. 28, 2021.

*Primary Examiner* — Barbara B Anyan
(74) *Attorney, Agent, or Firm* — Hodgson Russ LLP (57) ABSTRACT

A dynamic path verification method based on reorganization of authentication fragments is proposed. The method includes: sending an initial expected path verification structure to a data packet sending end via a guarantee service node, and sending notification information to the respective routing nodes on an initial expected path; after updating the initial expected path to a new expected path, inserting the new expected path verification structure into a subsequent data packet to be sent, verifying the data packet by other nodes except a migration node, and sending the subsequent data packet to be sent to a next hop of routing node; performing the parsing verification on the received data packet by the migration node.

10 Claims, 2 Drawing Sheets

(56) References Cited

U.S. PATENT DOCUMENTS

| | | | |
|---|---|---|---|
| 2010/0045442 A1* | 2/2010 | Lu | H04L 9/3271 |
| | | | 713/168 |
| 2011/0293094 A1* | 12/2011 | Os | H04L 9/0869 |
| | | | 380/255 |
| 2020/0103894 A1* | 4/2020 | Cella | G05B 23/0264 |
| 2023/0006840 A1* | 1/2023 | Pettit | H04L 9/3239 |

* cited by examiner

DYNAMIC PATH VERIFICATION METHOD BASED ON REORGANIZATION OF AUTHENTICATION FRAGMENTS

CROSS-REFERENCE TO RELATED APPLICATIONS

The present application is a continuation of International Application No. PCT/CN2021/088810, which is based upon and claims priority to Chinese Patent Application No. 202010332303.9, filed on Apr. 24, 2020, the entire contents of which are incorporated herein by reference.

FIELD

The present disclosure relates to a technical field of network security, and more particularly, to a dynamic path verification method based on reorganization of authentication fragments.

BACKGROUND

The development of the Internet has formed a huge system of complex protocol interweaving.

Routing protocols have gradually become a key component of network protocols. Efficient, stable and secure routing is an important factor to ensure network transmission performance.

SUMMARY

The present disclosure aims at solving technical problems in the related art to at least some extent.

Embodiments of the present disclosure provides a dynamic path verification method based on reorganization of authentication fragments. The method includes: sending an initial expected path verification structure to a data packet sending end via a guarantee service node, and sending notification information to the respective routing nodes on an initial expected path; inserting the initial expected path verification structure by the data packet sending end into a data packet to be sent, sending the inserted data packet to a next hop of routing node based on the initial expected path; performing, by a routing node on the initial expected path after receiving the data packet, a parsing verification on the data packet according to a session symmetric key of the routing node and the initial expected path verification structure, and continuing to send the data packet to a next routing node in a case that the parsing verification passes; updating the initial expected path to a new expected path in a case that the initial expected path changes, resending an application to the guarantee service node by the data packet sending end, generating a new expected path verification structure by the guarantee service node according to the new expected path, sending the new expected path verification structure to the data packet sending end and a migration node, and sending new notification information to the respective routing nodes; inserting the new expected path verification structure by the data packet sending end into a subsequent data packet to be sent, and sending the subsequent data packet to be sent to a next hop of routing node, performing the parsing verification on the received data packet by intermediate routing nodes except for the migration node, and forwarding the data packet to a next hop of routing node in a case that the parsing verification passes; performing the parsing verification on the received data packet by the migration node, determining whether the data packet is inserted into the new expected path verification structure in a case that the parsing verification passes, replacing the initial expected path verification structure inserted with the data packet by the new expected path verification structure in a case that the data packet is not inserted into the new expected path verification structure, and sending the data packet to a next hop of routing node on the new expected path to continue performing verification in a case that the data packet is inserted into the new expected path verification structure; and performing the parsing verification on the received data packet by a data packet receiving end, determining whether source address information in a header of the data packet is consistent with expected starting node information in a case that the parsing verification passes, completing verification of the data packet on a session transmission path and determining that data packet is normal in a case that the source address information in the header of the data packet is consistent with the expected starting node information, and discarding the data packet in a case that the source address information in the header of the data packet is inconsistent with the expected starting node information.

The additional aspects and advantages of the present disclosure will be partially given in the following description, and some will become obvious from the following description, or be understood through the practice of the present disclosure.

DESCRIPTION OF DRAWINGS

The above and/or additional aspects and advantages of the present disclosure will become obvious and easy to understand from the following description of the embodiments in conjunction with the accompanying drawings, in which.

DETAILED DESCRIPTION

The embodiments of the present disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary, and are intended to explain the present disclosure, but should not be construed as limiting the present disclosure.

In the related arts, security reinforcement strategies for routing protocols continue to emerge and gradually attract attentions. For example, the S-BGP security mechanism strengthens the authenticity and legitimacy of the routing information released by the BGP inter-domain routing protocol to solve the problems such as security threats for the current BGP protocol during operation. If the upgrade protection of the routing protocol is essential, then whether the protocol strategy is actually implemented is also of great significance. In the process of network data transmission, verifying whether the actual forwarding path of the session data packet is consistent with the path strategy is the basic issue to ensure the secure and reliable execution of the network protocol.

In view of the authenticity verification problem of the above-mentioned data packet routing and forwarding, the existing research work is mainly to generate a data packet verification structure based on the expected path information, that is, to authenticate the predetermined path strategy of the session, and each routing node parses the verification structure of the received data packet to check the actual forwarding state of the data packet, so as to determine whether the data packet is correctly sent to the destination according to the predetermined path. However, when there are some special circumstances in the network operating environment, such as dynamic changes in the network topology caused by link interruption, failover, etc., or potential malicious nodes are found in the network environment to compromise data transmission security, there is a requirement of adjusting and changing the planned route strategy accordingly in order to avoid nodes with potential safety hazards. If the predetermined path strategy changes during the operation of the verification protocol, the existing technical solutions mainly consider how to use the entire expected path information to generate a data packet verification structure, and verify whether the data packet is correctly sent to the destination according to the predetermined path, which does not support the adaptive adjustment of the verification function of each routing node after the predetermined path changes, thereby cannot continuing to perform the related work of the source and path verification of the session data packet for the new path strategy of the current session.

The dynamic path verification method based on reorganization of authentication fragments proposed in embodiments of the present disclosure will be described below with reference to the accompanying drawings.

First of all, a basic operating architecture on which the embodiments of the present disclosure rely includes a guarantee service node (Guarantee Service Node, GS) and a routing forwarding node ($R_i$). The GS node has general service functions such as generating path policy authentication, and the node may receive strategy information of the network operators, and interact with each network node. At the same time, the GS node and each routing and forwarding node $R_i$ under a jurisdiction of the GS node form an independent trust domain. In the trust domain, the GS node and a certain routing and forwarding node maintain the secret information shared only between them as a master key ($Key\_R_i$).

Assume that the GS node and a certain routing node $R_i$ will initially use a secure method (such as an existing method Diffie-Hellman) to exchange the master key information ($Key\_R_i$), and the routing node $R_i$ and the corresponding GS node will subsequently realize a derivation calculation of a certain session transmission symmetric key ($Key\_R_i.Session$) through a pseudo-random operation function (without re-executing the session symmetric key exchange between the two nodes).

According to the actual needs of the network operator, one or more GS nodes can be configured in the entire network, and the GS node itself can be a network entity or as a virtual function, which supports backup or migration on a trusted agent designated by the network operator to ensure a reliable operation of general service functions. For a certain session transmission, the GS node and each routing node $R_i$ can use an identity-based signature system (such as an existing system that uses an identity ID as a public key) to sign the verification control messages generated by themselves (that is, control information required for the dynamic verification process in addition to the actual data of the session), including session requests, mechanism responses, error reports, etc. These control messages have a high priority in transmission and communication. It is also assumed that in the network environment, each network node maintains correspondences between itself and neighbor nodes, and all nodes participating in a certain session maintain a loose time synchronization (such as using NTP time, etc.).

Figure 1:
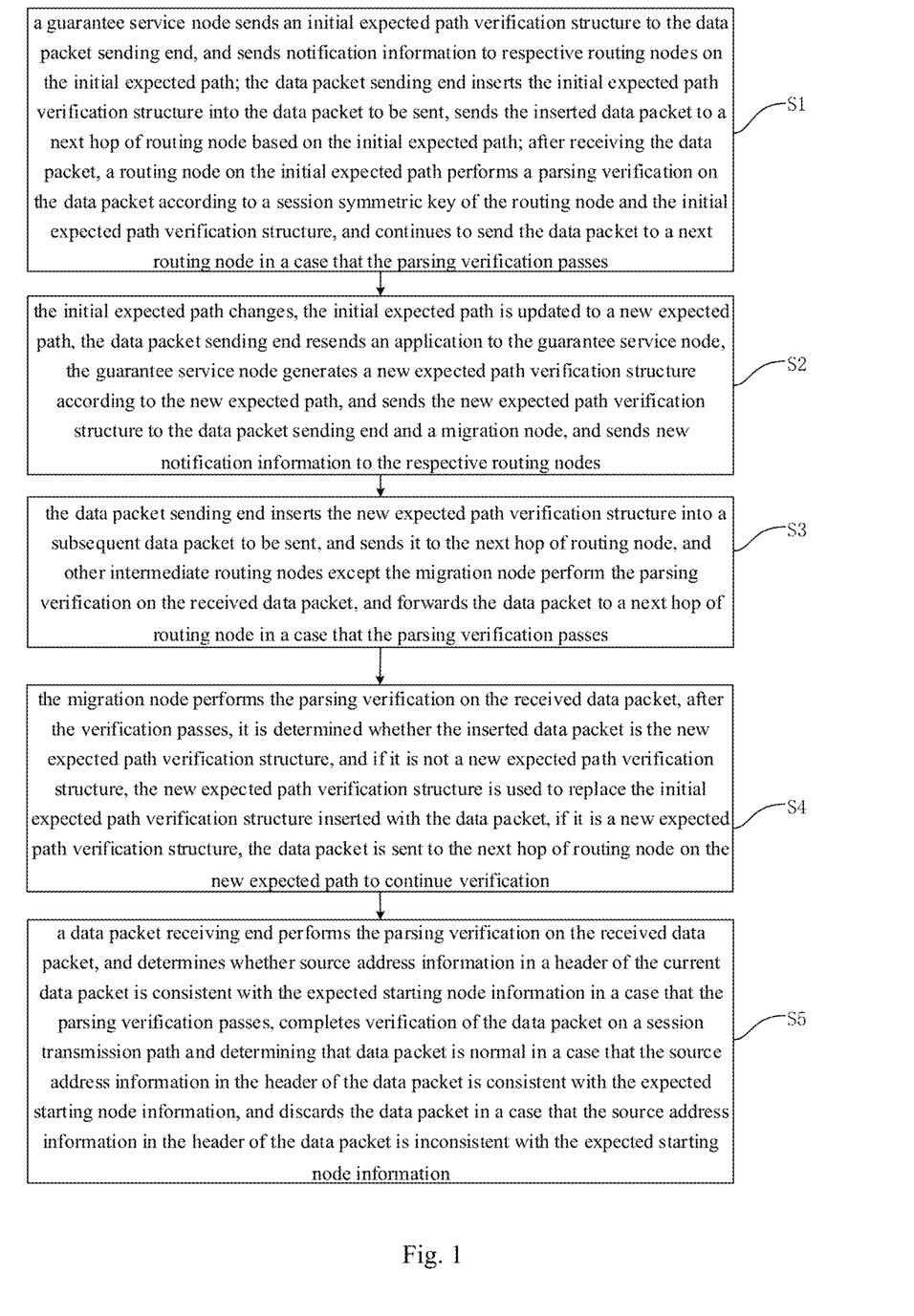
FIG. 1 is a flowchart of a dynamic path verification method based on reorganization of authentication fragments according to an embodiment of the present disclosure.

FIG. 1 is a flowchart of a dynamic path verification method based on reorganization of authentication fragments according to an embodiment of the present disclosure.

As shown in FIG. 1, the method includes following steps.

At step S1, a guarantee service node sends an initial expected path verification structure to the data packet sending end, and sends notification information to respective routing nodes on the initial expected path; the data packet sending end inserts the initial expected path verification structure into the data packet to be sent, sends the inserted data packet to a next hop of routing node based on the initial expected path; after receiving the data packet, a routing node on the initial expected path performs a parsing verification on the data packet according to a session symmetric key of the routing node and the initial expected path verification structure, and continues to send the data packet to a next routing node in a case that the parsing verification passes.

Further, the guarantee service node generates the expected path verification structure by encrypting expected previous hop of information and expected next hop of information of respective nodes on the expected path with a session symmetric key, and the expected path verification structure comprises multiple pieces of fragment information to be verified corresponding to routing nodes on the expected path.

Further, notification information received by different nodes on the expected path are different, and the notification information comprises expected previous hop of information of the respective routing nodes and a valid time limit, and the notification information is parsed through a session symmetric key of each node.

It is understandable that a routing node on the expected path extracts the expected path verification structure in the data packet after receiving the data packet, acquires expected previous hop of information of a current data packet with fragment information corresponding to the routing node in the expected path verification structure parsed with a session symmetric key of the routing node, and determines whether previous hop of information of an actual receiving port of the current data packet is consistent with the expected previous hop of information. The verification passes in a case that the previous hop of information of the actual receiving port of the current data packet is consistent with the expected previous hop of information, and the verification fails in a case that the previous hop of information of the actual receiving port of the current data packet is inconsistent with the expected previous hop of information.

When the verification fails, the data packet is discarded, and error report information is issued to a data flow source and a data flow destination. If the security requirement level is higher than the preset value, each routing node actively generates warning report information for a received session data packet with a random time interval within a session valid time limit, and transmits the warning report information to the guarantee service node, the data packet sending end and the data packet receiving end respectively, the warning report information at least describes the data packet receiving a session within a certain time interval and information on a state of the data packet passing or failing to pass the verification.

Specifically, in the initialization phase of a data session, the sending end obtains an initial path policy authentication from the GS node, that is, obtains the expected path verification structure (hereinafter referred to as the PV structure) that is encrypted and generated using the session symmetric key of each node. The PV structure is composed of multiple pieces of fragment information to be verified (hereinafter referred to as Pic information). A certain piece of Pic information is obtained by encrypting expected previous hop of information and expected next hop of information for a certain intermediate routing node $R_i$ with a session symmetric key of the node $R_i$. Here, the i-th piece of $Pic_i$ information is represented as $<R_{i-1}-R_{i+1}>$, and in particular, the last piece of $Pic_{Last}$ information is represented as $<R_{Last-1}R_0>$.

In addition, the GS node will send the notification information of the session to each routing node (including the receiving end) on the initial expected path. The notification information contains the expected previous hop of information of each routing node and a valid time limit of a session and other key information, which may be used to prompt the network node to prepare for the subsequent verification of the session. The notification information received by different nodes are different and can only be parsed by the session symmetric key Key_$R_i$.Session of the node.

After obtaining the initial expected path verification structure, the data packet sending end inserts the initial expected path verification structure between an IP header and a TCP header of the data packet, and sends the data packet to the next hop of routing node according to the initial path strategy.

On the transmission path, each routing node extracts the PV verification structure from a header of the received data packet, and only parses the Pic fragment information corresponding to itself. Specifically, a certain routing node $R_i$ only decrypts the $Pic_i$ fragments to obtain the expected previous hop of information $R_{i-1}$, and compares $R_{i-1}$ with the current actual forwarding state of the data packet, that is, to determine whether the previous hop information of the actual receiving port of the data packet (which is represented by $R_{i-1}'$) is consistent with $R_{i-1}$. If they are consistent, it means that the data packet has passed the previous hop of node of the expected path, the verification on the current forwarding state of the data packet passes, and the routing node will continue to forward the data packet. Otherwise, if the routing node $R_i$ finds that the verification fails, the data packet is discarded to avoid safety hazards caused by forwarding the abnormal data packet to the receiving end. At the same time, the routing node $R_i$ needs to issue error report information to the corresponding GS node, the sending end and the receiving end according to the actual situation. When the security requirement level is high, each routing node will also actively generate warning report information for the received session data packet at random time intervals within a session valid time limit (that is, the warning report information describes the data packet receiving the session within a certain time interval and whether the verification state thereof is normal, and other key contents), which is passed to the corresponding GS node, the sending end and the receiving end respectively.

At step S2, the initial expected path changes, the initial expected path is updated to a new expected path, the data packet sending end resends an application to the guarantee service node, the guarantee service node generates a new expected path verification structure according to the new expected path, and sends the new expected path verification structure to the data packet sending end and a migration node, and sends new notification information to the respective routing nodes.

When the initial expected path changes during the transmission and verification of the session data packet, the data packet sending end will resend an application to the guarantee service node. The application content includes at least the new expected path information for the session and an updated session valid time limit.

Further, after the initial expected path is updated to the new expected path, the guarantee service node resends the notification information related to the new expected path information, notifies the routing nodes subsequent to the migration node on the initial expected path to cancel the session, and notify the respective routing node on the new expected path to add or update the session.

Specifically, after the initial path policy is changed and updated to the new expected path, the data packet sending end obtains path policy authentication again. During the current session data transmission verification process, the initial path strategy is changed, and the data packet sending end resends the application to the GS node. The application content includes the new expected path information for the session, the updated session valid time limit, etc., so as to obtain a new path policy authentication (that is, a new expected path verification PV structure).

The guarantee service GS node generates a new path policy authentication, and sends it to the sending end and the migration node Rx respectively. At the same time, the GS node re-pushes the notification information of the session. The GS node completes the update calculation of the PV structure corresponding to the expected path verification according to the new expected path information in the session application. This new PV structure will be replied to the data packet sending end and the migration node for session transmission verification. The migration node is the first intersection of the new expected path and the initial expected path. In addition, the GS node will re-push the notification information of the session, notify the network node subsequent to the migration node on the initial expected path to cancel the session, and notify the respective network nodes on the new expected path to add or update the session.

At step S3, the data packet sending end inserts the new expected path verification structure into a subsequent data packet to be sent, and sends it to the next hop of routing node, and other intermediate routing nodes except the migration node perform the parsing verification on the received data packet, and forwards the data packet to a next hop of routing node in a case that the parsing verification passes.

The data packet sending end uses the new PV structure configuration to configure and assemble subsequent session data packets, and sends the session data packets carrying the new Pic fragments to the next hop of routing node. After receiving the session data packet, each intermediate routing node (except the migration node Rx) still perform the parsing verification on the actual forwarding state of the current data packet with the above-mentioned parsing verification method.

At step S4, the migration node performs the parsing verification on the received data packet, after the verification passes, it is determined whether the expected path verification structure inserted with the data packet is the new expected path verification structure, and if it is not a new expected path verification structure, the new expected path verification structure is used to replace the initial expected path verification structure inserted with the data packet, if it is a new expected path verification structure, the data packet is sent to the next hop of routing node on the new expected path to continue verification.

Further, determining whether the data packet is inserted into the new expected path verification structure includes: parsing the expected path verification structure of the data packet with the session symmetric key of the migration node to obtain an expected next hop of node of the data packet, and determining whether the expected next hop of node of the data packet is a node on the initial expected path or a node on the new expected path, replacing the initial expected path verification structure inserted with the data packet by the new expected path verification structure in a case that the expected next hop of node is the node on the initial expected path, and sending the data packet to the next hop of routing node to continue performing verification in a case that the expected next hop of node is the node on the new expected path.

The migration node Rx for session transmission verification not only needs to perform a parsing verification on the current forwarding state of the data packet, but also needs to determine whether the latest PV structure has been embedded in a header of the data packet, until all subsequent received data packets complete the verification state adjustment.

Specifically, first, the migration node Rx parses the $Pic_x$ fragment information associated with itself arrived at the header of the data packet with the parsing verification method, and completes the verification of the actual forwarding state of the data packet. If the verification fails, the migration node discards the abnormal data packet and needs to send an error report based on the actual situation.

If the verification passes, the migration node continues to check the $Pic_x$ fragment information carried in the packet header, and judges whether the expected next hop of node parsed by the $Pic_x$ fragment is a node on the initial expected path or a node on the new expected path. If it is a node on the initial expected path, it means that the data packet still carries the old PV structure, that is, the data packet has left the sending end before the path strategy is changed. The migration node Rx replaces the old Pic fragment of the data packet header by the new PV structure of the session replied from the GS node of the guarantee service to realize a flexible reorganization of the PV structure, and then sends the data packet to the normal next hop of node on the new expected path.

Once the expected next hop of node obtained by parsing the packet header is the node on the new expected path, the migration node Rx will stop the replacement operation of the corresponding Pic fragment of the PV structure of the data packet header, which means that the packet has been loaded with the latest PV verification structure, and the verification of the entire session has been dynamically adjusted to the new expected path.

At step S5, a data packet receiving end performs the parsing verification on the received data packet, and determines whether source address information in a header of the current data packet is consistent with the expected starting node information in a case that the parsing verification passes, completes verification of the data packet on a session transmission path and determining that data packet is normal in a case that the source address information in the header of the data packet is consistent with the expected starting node information, and discards the data packet in a case that the source address information in the header of the data packet is inconsistent with the expected starting node information.

When the session data packet arrives at the downstream routing node (including the final receiving end) of the migration node Rx on the new expected path, the node still uses the above-mentioned method of performing the parsing verification to parse and verify the actual forwarding state of the current data packet.

In particular, the receiving end $R_{Last}$ not only compares whether the previous hop of information $R_{Last-1}'$ of the actual receiving port of the current data packet is consistent with the expected previous hop of information $R_{Last-1}$ obtained by parsing with the above-mentioned parsing verification method, but also determines whether the sending source address information in the header of the data packet is consistent with the expected starting node information $R_0$ obtained after parsing. If all the above verifications are passed, it means that the verification of the data packet on the entire session transmission path has been completed, and the received data packet is in a normal state. Otherwise, if the receiving end finds that the verification fails, the data packet is discarded to prevent the abnormal data packet from causing greater security hazards.

The embodiment of the present disclosure focuses on the forwarding verification of the data packet during the transmission process. The problems solved are routing selection and even the network failure recovery problems. When the predetermined path strategy changes, embodiments of the present disclosure guarantee that the source and path verification work is performed normally after reconstruction in the network environment (if it is needed). It is assumed that the sending end (or receiving end) of the session can reach an agreement with the network operator in advance, and learn the predetermined path strategy in advance in a variety of ways, such as through network topology analysis, obtaining BGP protocol path notifications, or relying on existing control plane routing protocols. In addition, in the initialization phase of the dynamic path verification technology, the sending end already has multiple candidate path strategies, and the candidate path information can be confirmed with the receiving end on demand.

Figure 2:
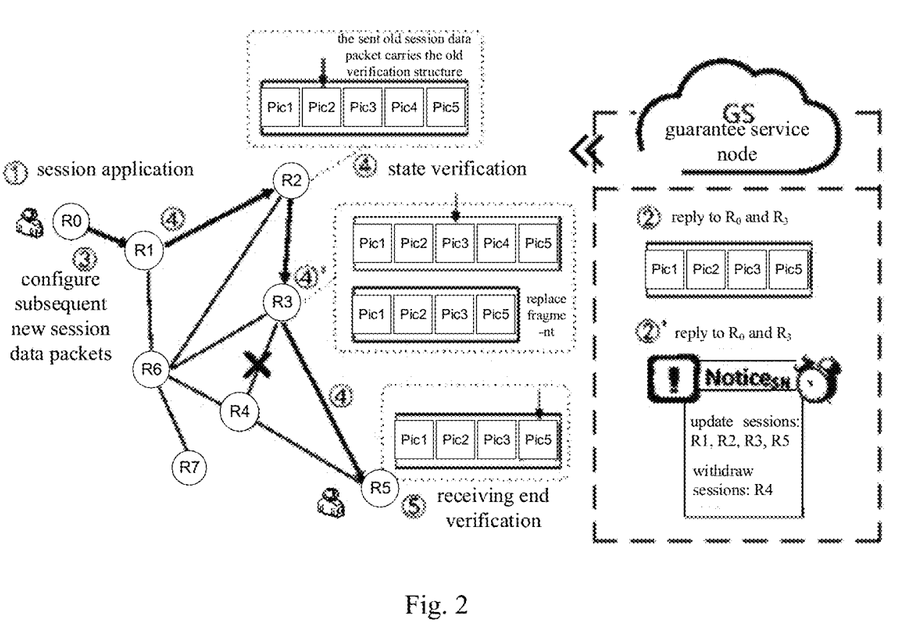
FIG. 2 is a flowchart of a dynamic path verification method based on reorganization of authentication fragments according to an embodiment of the present disclosure.

FIG. 2 is a flowchart of a dynamic path verification method based on reorganization of authentication fragments according to an embodiment of the present disclosure. The specific working process of the method is explained according to the specific example in FIG. 2.

Suppose that the expected transmission path $Path_1$ corresponding to the initial path strategy of a certain session is $R_0 \rightarrow R_1 \rightarrow R_2 \rightarrow R_3 \rightarrow R_4 \rightarrow R_5$. The expected transmission path $Path_2$ after the dynamic change of the path strategy is $R_0 \rightarrow R_1 \rightarrow R_2 \rightarrow R_3 \rightarrow R_5$, the dynamic verification on the transmission path from $Path_1$ to $Path_2$ may be completed based on the dynamic path verification technology based on reorganization of authentication fragments.

1) The sending end $R_0$ re-sends a session application to the GS node, the application content includes the new expected path information $Path_2$ for the session, the updated session valid time limit, etc., so as to obtain the new expected path verification structure PV' again.

2) The guarantee service GS node updates and calculates the corresponding expected path verification structure PV' to $\{Pic_1, Pic_2, Pic_3, Pic_5\}$ according to the new expected path information $Path_2$ in the session application, and replies this PV' structure to the sending end $R_0$ and migration node $R_3$ for session transmission verification. At the same time, the GS node will re-push the notification information of the session, notify the network node $R_4$ after the migration node $R_3$ on the initial expected path $Path_1$ to cancel the session, and notify the network nodes $R_1$, $R_2$, $R_3$ and $R_5$ on the new expected path $Path_2$ to add or update the session.

3) The sending end $R_0$ uses the new PV' structure configuration to assemble subsequent session data packets, and sends the session data packets carrying the new fragment information {$Pic_1$, $Pic_2$, $Pic_3$, $Pic_5$} to the next hop of routing node.

4) After each intermediate routing node (except for the migration node $R_3$) receives the session data packet, the expected path verification structure carried in the data header may be extracted, and parse only the Pic fragment information corresponding to the node itself with its own session key, and it is determined whether the actual forwarding status of the data packet is normal. For example, the data packet currently received by the routing node $R_2$ has been transmitted by the sending end $R_0$ before the path strategy is changed, and still carries the old verification structure PV as {$Pic_1$, $Pic_2$, $Pic_3$, $Pic_4$, $Pic_5$}. The node $R_2$ uses its own session key Key_$R_2$ to parse the $Pic_2$ fragment <$R_1R_3$> only, so as to obtain the expected previous hop of information $R_1$, and determines whether the previous hop of information $R_1$' of the actual receiving port of the data packet is consistent with $R_1$. If they are the consistent with each other, it means that the data packet has passed the last hop node $R_1$ recognized by the expected path, and the current forwarding state of the data packet has passed the verification, and the routing node will continue to follow the routing strategy (that is, the routing strategy can be a deployed routing protocol or a specific path Strategy) forward the packet.

Otherwise, if the routing node $R_2$ finds that the verification fails, it will discard the data packet to prevent the abnormal data packet from continuing to reach the receiving end $R_5$, causing security hazards. At the same time, the routing node $R_2$ needs to report to the corresponding GS node, the sending end $R_0$ and the receiving end according to the actual situation. End $R_5$ releases error report information.

When the level of security requirements is high, each routing node will also actively generate early warning report information for the received session data packet at random time intervals within the valid time limit of the session (that is, the early warning report information indicates that the session has been received within a certain time interval). The data packet, its verification status is normal and other key content), is passed to the corresponding GS node, the sending end $R_0$ and the receiving end $R_5$.

5) The migration node $R_3$ for session transmission verification first parses the $Pic_3$ fragment information <$R_2R_4$> associated with itself in the header of the packet according to the above method (see the intermediate routing node verification method at step 4), and an inspection of the actual forwarding state of the data packet is completed according to the expected previous hop of information $R_2$. If the verification fails, the migration node $R_3$ discards the abnormal data packet and needs to send an error report and an early warning report based on the actual situation. Secondly, if the verification is passed, the migration node $R_3$ will continue to determine whether the expected next hop of information $R_4$ parsed by the fragment $Pic_3$ is a node on the initial expected path $Path_1$ or a node on the new expected path $Path_2$. If it is a node on the initial expected path, it means that the data packet still carries the old PV structure, and the new verification structure PV' of the session replied by the GS node is {$Pic_1$, $Pic_2$, $Pic_3$, $Pic_5$}, the migration node $R_3$ replaces the old Pic fragment in the packet header so as to realize the verification structure update, and then the data packet is sent to a normal next hop of node $R_5$ on the new expected path $Path_2$. Once the migration node $R_3$ parses the $Pic_3$ fragment information in the packet header as <$R_2R_5$>, the expected next hop of information is the node $R_5$ on the new expected path $Path_2$, and the migration node $R_3$ will stop updating the verification structure of the packet header, which means that the data packet has been loaded with the latest PV' verification structure, and the verification of the entire session has been dynamically adjusted to the new expected path $Path_2$.

6) The session data packet arrives at a downstream routing node of the migration node $R_3$ on the new expected path $Path_2$. After reaching the receiving end $R_5$ as shown in FIG. 2, the receiving end $R_5$ first compares the previous hop of information $R_3$' of the actual receiving port of the current data packet with the parsed expected previous hop of information $R_3$ according to the method at step 4) above and determine whether they are consistent, and determine whether the source address information $R_0$' in the header of the current data packet is consistent with the parsed expected start node information $R_0$. If all the above verifications are passed, it means that the verification of the data packet on the entire session transmission path has been completed, and the received data packet is in a normal state. Otherwise, if the receiving end finds that the verification fails, the data packet will be discarded to prevent abnormal data packets from causing greater security hazards.

According to the dynamic path verification method based on the reorganization of authentication fragments proposed in the embodiment of the present disclosure, during an end-to-end data session, if the path strategy changes, it can be flexibly reorganized by updating and reorganizing part of the authentication information in the data packet verification structure, such that the controlled migration of the verification function of each node on the forwarding path and the dynamic verification of the session transmission path can be easily realized. In particular, in the software-defined network architecture, the communication between the control plane and the forwarding plane can be used to more validly implement the issuance of new authentication fragments and session notifications after the path policy is adjusted, which further improves the reliability of the state information transmission related to dynamic path verification technology. It can provide better services for reliable and safe data transmission.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "a plurality of" means at least two, such as two, three, etc., unless otherwise specifically defined.

In the description of this specification, descriptions with reference to the terms "one embodiment", "some embodiments", "examples", "specific examples", or "some examples" etc. mean specific features described in conjunction with the embodiment or example, structure, materials or features are included in at least one embodiment or example of the present disclosure. In this specification, the schematic representations of the above terms do not necessarily refer to the same embodiment or example. Moreover, the described specific features, structures, materials or characteristics can be combined in any one or more embodiments or examples in a suitable manner. In addition, those skilled in the art can combine and combine the different embodiments or examples and the features of the different embodiments or examples described in this specification without contradicting each other.

Although the embodiments of the present disclosure have been shown and described above, it can be understood that the above-mentioned embodiments are exemplary and should not be construed as limiting the present disclosure. Those of ordinary skill in the art can comment on the above-mentioned embodiments within the scope of the present disclosure. The embodiment undergoes changes, modifications, substitutions, and modifications.

What is claimed is:

1. A dynamic path verification method based on reorganization of authentication fragments, comprising:
sending an initial expected path verification structure to a data packet sending end via a guarantee service node, and sending notification information to respective routing nodes on an initial expected path; inserting the initial expected path verification structure by the data packet sending end into a data packet to be sent, sending the inserted data packet to a next hop of routing node based on the initial expected path; performing, by a routing node on the initial expected path after receiving the inserted data packet, a parsing verification on the inserted data packet according to a session symmetric key of the routing node and the initial expected path verification structure, and continuing to send the inserted data packet to a next routing node in a case that the parsing verification passes;
updating the initial expected path to a new expected path in a case that the initial expected path changes, resending an application to the guarantee service node by the data packet sending end, generating a new expected path verification structure by the guarantee service node according to the new expected path, sending the new expected path verification structure to the data packet sending end and a migration node, and sending new notification information to the respective routing nodes;
inserting the new expected path verification structure by the data packet sending end into a subsequent data packet to be sent, and sending the subsequent data packet to be sent to a next hop of routing node, performing the parsing verification on a received data packet by intermediate routing nodes except for the migration node, and forwarding the received data packet of the intermediate routing nodes to a next hop of routing node in a case that the parsing verification passes;
performing the parsing verification on a received data packet by the migration node, determining whether the received data packet of the migration node is inserted into the new expected path verification structure in a case that the parsing verification passes, replacing the initial expected path verification structure inserted with the received data packet of the migration node by the new expected path verification structure in a case that the data packet is not inserted into the new expected path verification structure, and sending the received data packet of the migration node to a next hop of routing node on the new expected path to continue performing verification in a case that the data packet is inserted into the new expected path verification structure; and
performing the parsing verification on a received data packet by a data packet receiving end, determining whether source address information in a header of the received data packet of the data packet receiving end is consistent with expected starting node information in a case that the parsing verification passes, completing verification of the received data packet of the data packet receiving end on a session transmission path and determining that data packet is normal in a case that the source address information in the header of the received data packet of the data packet receiving end is consistent with the expected starting node information, and discarding the received data packet of the data packet receiving end in a case that the source address information in the header of the received data packet of the data packet receiving end is inconsistent with the expected starting node information.

2. The method of claim 1, further comprising:
generating, by the guarantee service node, the expected path verification structure by encrypting expected previous hop of information and expected next hop of information of respective nodes on the expected path with a session symmetric key, wherein the expected path verification structure comprises a plurality of pieces of fragment information to be verified corresponding to routing nodes on the expected path.

3. The method of claim 1, wherein notification information received by different nodes on the expected path are different, and the notification information comprises expected previous hop of information of the respective routing nodes and a valid time limit, and the notification information is parsed through a session symmetric key of each node.

4. The method of claim 1, further comprising:
extracting the expected path verification structure in the data packet by a routing node on the expected path after receiving the data packet, acquiring expected previous hop of information of a current data packet with fragment information corresponding to the routing node in the expected path verification structure parsed with a session symmetric key of the routing node, determining whether previous hop of information of an actual receiving port of the current data packet is consistent with the expected previous hop of information, determining that the verification passes in a case that the previous hop of information of the actual receiving port of the current data packet is consistent with the expected previous hop of information, and determining that the verification fails in a case that the previous hop of information of the actual receiving port of the current data packet is inconsistent with the expected previous hop of information.

5. The method of claim 4, further comprising:
performing the parsing verification on the received data packet by each routing node on the expected path, discarding the data packet and issuing error report information to the guarantee service node corresponding to the routing node, the data packet sending end and the data packet receiving end in a case that the verification fails.

6. The method of claim 5, further comprising: in a case of failing to pass the verification and a security requirement level being greater than a preset value, actively generating, by each routing node, warning report information for a received session data packet with a random time interval within a session valid time limit, and transmitting the warning report information to the guarantee service node, the data packet sending end and the data packet receiving end respectively, wherein the warning report information at least describes a data packet receiving a session within a certain time interval and information on a state of the data packet passing or failing to pass the verification.

7. The method of claim 1, wherein during a transmission and verification process of a session data packet, the data packet sending end retransmits an application to the guarantee service node in a case that the initial expected path changes, and the application comprises at least new expected path information of the session and an updated session valid time limit.

8. The method of claim 1, wherein the migration node is a first intersection node of the initial expected path and the new expected path.

9. The method of claim 1, further comprising:
resending, by the guarantee service node, notification information related to the new expected path after the initial expected path is updated to the new expected path, and notifying each routing node on the initial expected path subsequent to the migration node to cancel a session, and notifying each routing node on the new expected path to add or update the session.

10. The method of claim 1, wherein determining whether the data packet is inserted into the new expected path verification structure comprises:

parsing the expected path verification structure of the data packet with the session symmetric key of the migration node to obtain an expected next hop of node of the data packet, and determining whether the expected next hop of node of the data packet is a node on the initial expected path or a node on the new expected path, replacing the initial expected path verification structure inserted with the data packet by the new expected path verification structure in a case that the expected next hop of node is the node on the initial expected path, and sending the data packet to the next hop of routing node to continue performing verification in a case that the expected next hop of node is the node on the new expected path.

* * * * *